United States Patent

[11] 3,596,166

| | | |
|---|---|---|
| [72] | Inventors | Werner Faust<br>Wettingen, Switzerland;<br>Jurgen Langer, Waldhut, Germany |
| [21] | Appl. No. | 829,979 |
| [22] | Filed | June 3, 1969 |
| [45] | Patented | July 27, 1971 |
| [73] | Assignee | Aktiengesellschaft Brown Boveri & Cie<br>Baden, Switzerland |
| [32] | Priority | June 10, 1968 |
| [33] | | Sweden |
| [31] | | 8598-68 |

[54] CONVERTER ARRANGEMENT FOR ALTERNATING AND DIRECT CURRENT OPERATION
4 Claims, 3 Drawing Figs.

[52] U.S. Cl. ........................................... 321/5, 321/14
[51] Int. Cl. ................................. H02m 1/18
[50] Field of Search ........................................ 321/5, 11—14, 27

[56] References Cited
UNITED STATES PATENTS

| | | | |
|---|---|---|---|
| 3,319,149 | 5/1967 | Start................ | 321/14 |
| 3,359,481 | 12/1967 | Bjork................ | 321/27 |
| 3,365,613 | 1/1968 | Hammarlund........ | 315/350 X |
| 3,366,866 | 1/1968 | King................ | 321/14 |
| 3,423,664 | 1/1969 | Dewey................ | 321/11 |
| 3,458,795 | 7/1969 | Ainsworth......... | 321/13 X |
| 3,488,560 | 1/1970 | Konopa............. | 321/11 X |

*Primary Examiner*—William M. Shoop, Jr.
*Attorney*—Pierce, Scheffler and Parker

ABSTRACT: A converter arrangement is provided which can be set to operate both as an inverter and as a rectifier and wherein the converter elements are constituted by thyristors which are liable to damage by sharply rising voltages thereon brought about by overcurrent conditions when the converter is operating as a rectifier. To protect the converter elements against damage in such event, means are provided for changing over the operating mode of the converter from rectifier to inverter operation and to also cut off the converter operation completely after a predetermined time delay if the overcurrent condition persists.

CONVERTER ARRANGEMENT FOR ALTERNATING AND DIRECT CURRENT OPERATION

The present invention relates to a converter arrangement for operation both as an inverter, in changing an alternating current input from a supply source of one frequency to an output of another frequency, and also as a rectifier, in changing the alternating current input to a direct current output.

More particularly, the invention relates to an improved protective arrangement for the converter structure in which the operating mode is automatically switched from rectifier operation to inverter operation in the event of a condition wherein an excessive direct current is caused to flow, such as would be occasioned by a short circuit, and the converter is then completely cut off after a predetermined time delay in the event that the overcurrent condition persists.

In a converter arrangement which utilizes one or a plurality of thyristors connected in series, it is particularly important to protect the thyristors against overcurrent, i.e. short circuit conditions. Otherwise the thyristor is liable to become so damaged as to no longer be useful. Accordingly, the overcurrent condition must be eliminated as quickly as possible or its effect must be reduced. In the presently known embodiments of converters, the short circuits are cut off by existing switches or by fuses, the control of the converters remaining either unchanged or the converters being switched to inverter operation. In this switching to inverter operation the so-called respect interval must be observed. This prevents the complete controlling in inverter operation. The rise of the voltage in the converters becomes thus very steep, so that particularly thyristors are jeopardized. One therefore endeavors in these cases to reduce the respect interval to an admissible minimum. However, the voltage stress can not be completely eliminated by it. Particularly in high voltage rectifiers.

The foregoing as well as other objects and advantages inherent in the invention will become more apparent from the following detailed description of two different embodiments and from the accompanying drawings wherein.

Figure 1:
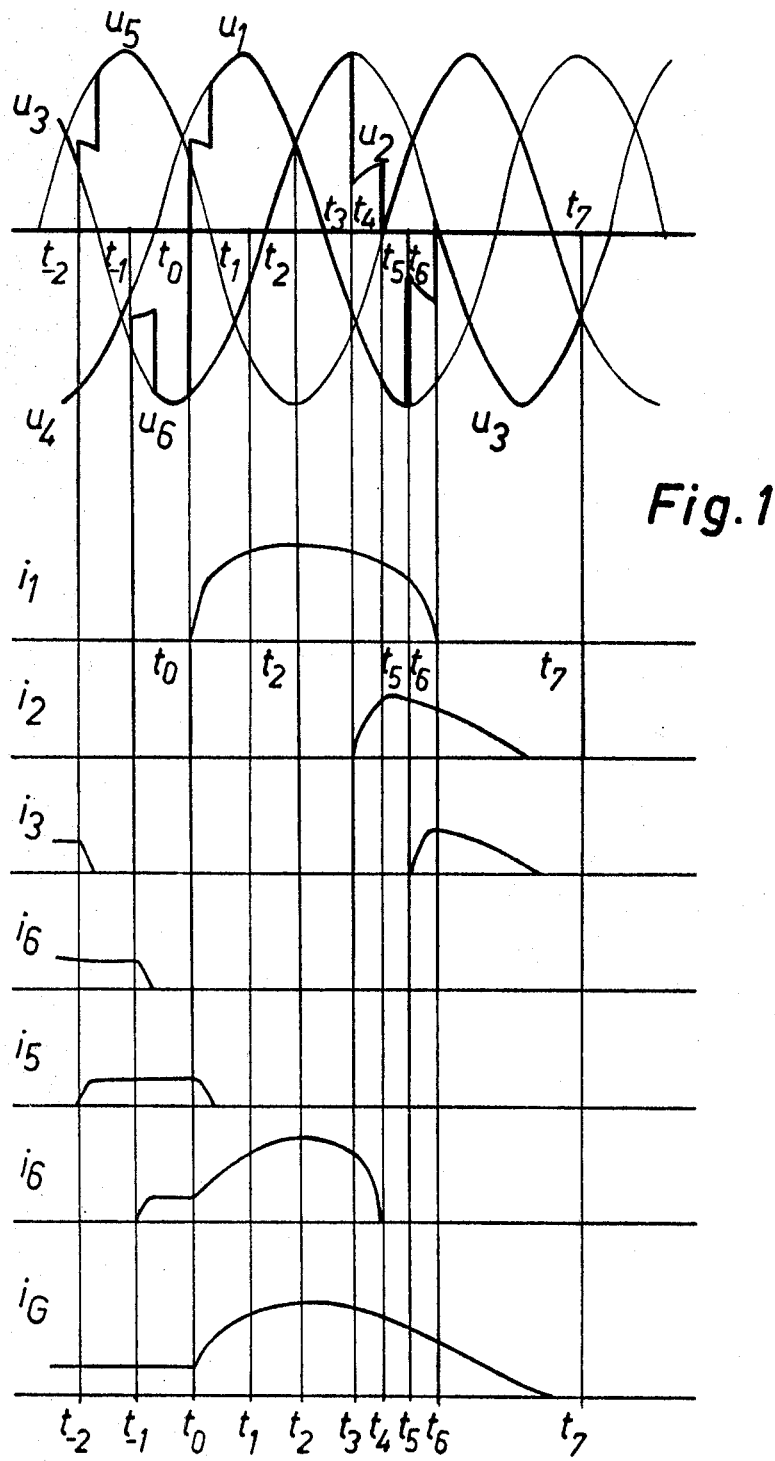
FIG. 1 is a family of curves showing the relation between voltage and current values appertaining to a plurality of thyristor elements connected for converter operation, as a function of time.
Figure 2:
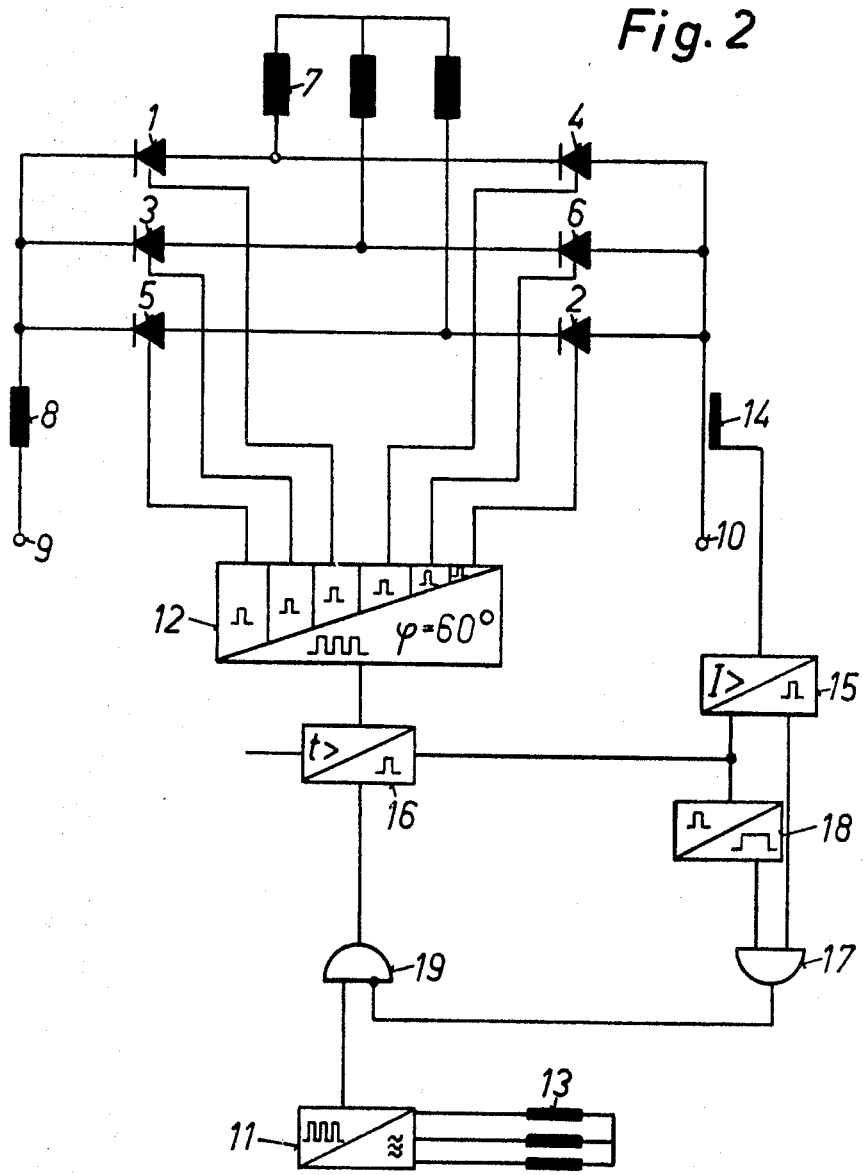
FIG. 2 is an electrical schematic diagram of one embodiment of the invention.

With reference now to the drawings, and to FIG. 2, it is seen that the converter arrangement comprises a plurality of thyristors arranged in a conventional bridge-connection, the thyristors being numbered 1 to 6. On the assumption that the ignition current impulses to the thyristors are so arranged that the converter system operates as a rectifier, the method of operation can be more fully explained on the basis of the family of curves illustrated in FIG. 1. In advance of the time instant $t_o$, operation of the converter is assumed to be normal. It can be assumed that sequentially, converters 3 and 4, then 4 and 5, and finally 5 and 6 are triggered with impulse currents to render them conductive to supply a direct current load. This is represented in FIG. 1 where curves $U_1$ to $U_6$ designate the alternating current voltages applied as inputs to the converter elements and curves $i_1$ to $i_6$ designate the currents. The current curve $i_G$ designates the total direct current supplied to the load. The heavy lined voltage curves designate the converter components which are conducting current at this time. First it is assumed that converters 3 and 4 have been ignited and made conductive. At the time $t_{12}$ the converter 5 is ignited, at the time $t_{11}$ the converter 6, so that the current changes over to this converter element. This is indicated by the curves $i_3 - i_6$. If there were no short circuit, the converter element 1 would be ignited at the time $t_o$ and the converter 2 at the time $t_1$. At the time $t_o$, however, a short circuit is assumed to appear on the DC side. The voltage in the DC circuit collapses then suddenly. During this time the converters 1 and 6 carry the short circuit current. The current $i_1$ starts approximately at the same time. Immediately the converter 6 also carries the current $i_6$. As soon as the short circuit current has attained a certain value, an excess current member, for example, a trigger, switches to inverter operation. The converter 2 is thus ignited not at the point $t_1$, but only at the time $t_3$. Until then the converter 6 maintains its current $i_6$. The current is then switched to converter 2. The converter 6 continues to run, however, as an inverter. At the time $t_5$ the current is switched from converter 1 to converter 3, about 180° after the first zero passage of the voltage at the terminals of the converter (zero passage at point $t_2$, where the voltage curves $U_1$ and $U_6$ intersect each ignition impulse will be suppressed. From then on no converter ignites anymore. The current declines therefore and extinguishes finally. The voltage rises sinusoidally as usual and yields no dangerous steep voltage slopes. The converters, which consist at high operating voltages of several series-connected thyristors, are then loaded considerably less by steep voltage increases and it is possible to use fewer series-connected transistors at high operating voltages. This is of great economical importance for the transmission of high voltage direct current.

With further reference to FIG. 2, the individual converters which, as previously explained, consist of several series-connected thyristors, designated with 1 to 6 are fed from a three-phase supply mains from the transformer 7. Only the secondary side of this transformer is shown. 8 is an inductance coil which represents the inductance of the DC circuit. The DC terminals are designated with 9 and 10. The control device consists of an impulse generator 11 and a pulse distributor 12 which distributes the impulses at intervals of $\Phi=60°$ over the individual converters 1 to 6. At the output are produced control impulses which effect the ignition of the converters. The impulse generator 11 is fed from the impulse transformer 13. The impulse shift in normal operation is effected in known manner by the impulse generator itself or by the impulse transformer.

In addition, a DC transformer 14 is provided, which carries a direct current proportional to the load current to a trigger 15 which functions as an excess current member. The latter responds when the current has attained a certain value above the nominal value, for example, when a short circuit occurs in the DC load side. The trigger 15 has two outputs, of which one is conducted to an impulse shifter 16 which shifts the impulse sequence to the thyristors, when a short circuit occurs, from rectifier to inverter operation, observing the respect interval. The second output is connected with the input of an AND member 17. Besides, a delayed bistable multivibrator 18 is provided between the trigger 15 and AND member 17 which emits an impulse to the AND member 17 after a predetermined delay, which is about 180° to 270° of the alternating current wave following the first zero passage of the rectified direct current voltage. In addition, a negative AND member 19 is provided, to which is conducted the output of the AND member 17 and also the control impulses from the impulse generator 11.

The method of operation is as follows: In normal operation the impulses of the impulse generator 11 are at the AND member 19, but there is no impulse from the AND member 17. The negative AND member 19 thus transmits the impulses. The impulse shifter receives no impulse from the trigger 15, and it thus transmits the impulses without shifting. They arrive in the impulse distributor and are distributed there to the individual converters. In the case of a short circuit, the trigger 15 emits an impulse as a result of the increased current in the current transformer 14. This impulse arrives in the impulse shifter 16 and shifts the impulses so that only inverter operation is possible. In addition, the impulse arrives at the multivibrator 18 where an impulse is produced after a certain predetermined time delay and arrives in the AND member 17.

If there is still excess current present, that is, if there is still an impulse on the AND member from the trigger 15, an impulse is formed on the output which arrives in the negative AND member 19 so that the latter now blocks and does not transmit any further impulses from the impulse generator 11. The control of the converters 1 to 6 is thus definitely stopped.

Figure 3:
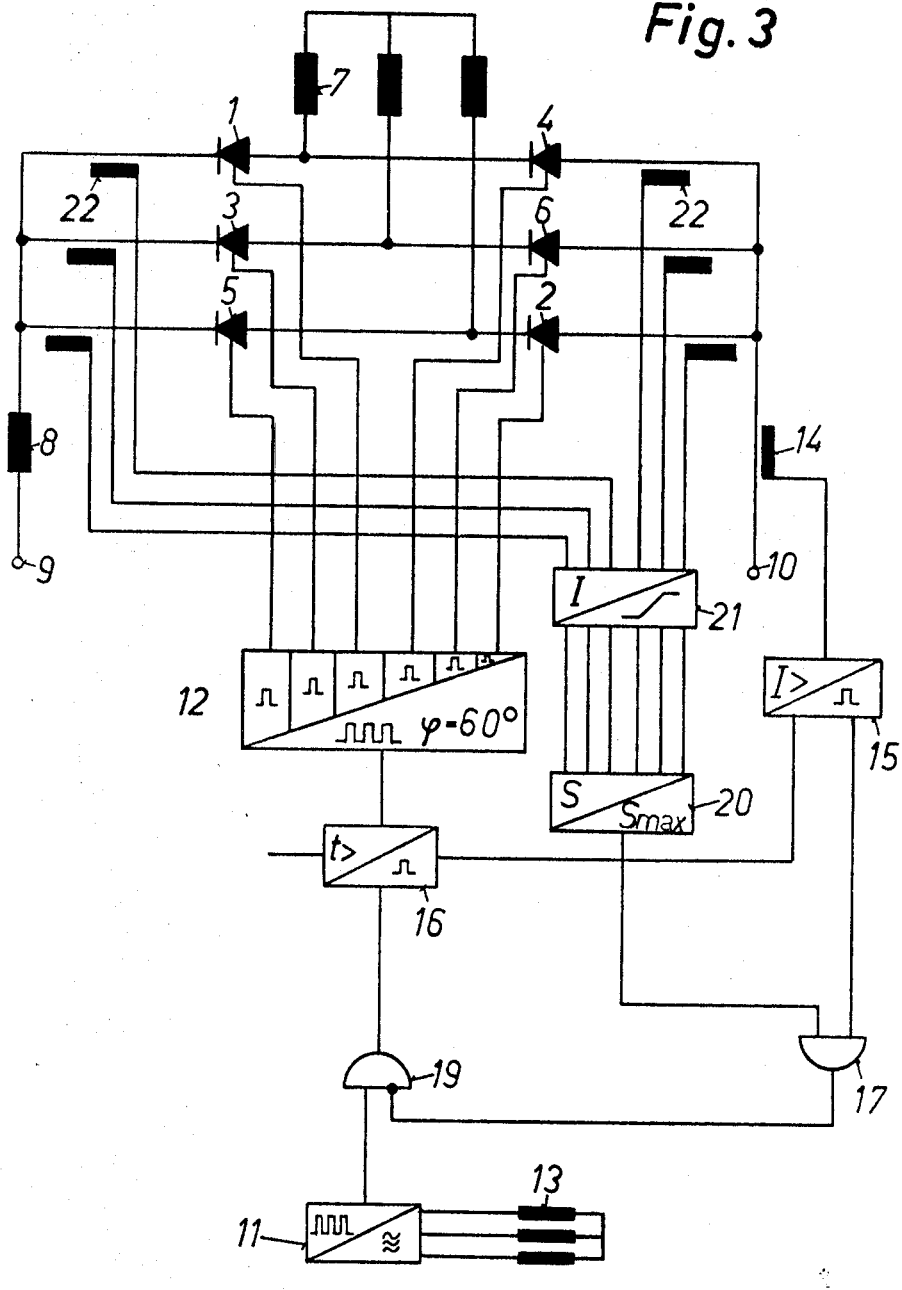
FIG. 3 is also an electrical schematic diagram of a second embodiment of the invention which is similar to that of FIG. 2 but differs in the manner in which the time delay interval preliminary to converter cut off is produced.

FIG. 3 shows another example of the invention where no fixed time delay is provided, but where the largest current-time area of the individual converters is determined by integration in the case of a short circuit and an impulse is emitted, after this value has been determined, to block the control impulses.

As far as the reference numbers refer to the same parts, they are the same as in FIG. 2. Only the device for blocking the impulses is different. The trigger 15 is fed from the current transformer 14 which emits the shifting signal to the impulse shifter 16. The converters are thus switched from rectifier to inverter operation in case of excessive current flow during rectifier operation, as in FIG. 2. The output signal of the trigger 15 is sent immediately to the AND member 17. The latter contains an additional signal from a maximum value device 20 which is fed from a multiple integrator 21. The latter in turn receives all currents of the individual converters 1 to 6 from the DC transformer 22. It integrates the currents according to time. The maximum value device 20 transmits then only the maximum value of the integrated currents. If now the maximum value (according to FIG. 1, the current $i_1$ of the converter 1) gives its signal and a signal exists at the same time from the trigger 15, the AND member 17 emits an impulse to the negative AND member 19, which then no longer transmits any impulses from the impulse generator 11. The control of the converters is thus completely interrupted after the expiration of the integration time of the integrator 21.

this measure has the effect that only low voltage rising rates, which do not exceed the rising rate in normal operation, are applied to the converter and excessive stress is thus avoided. MOREOVER, PARTICULARLY IN THE CASE OF HIGH VOLTAGE CONVERTER INSTALLATIONS WHERE EACH OF THE INDIVIDUAL CONVERTERS IS ASSEMBLED FROM SEVERAL SERIES-connected thyristors, the invention is of considerable practical value since without it, in order to be able to make the steep voltage rises resulting from short circuit conditions less effective, it would be necessary to connect a larger number of thyristors in series. HOwever, this alternative expedient obviously reduces the economy of the converter plant.

We claim:

1. In a converter arrangement the combination comprising a plurality of thyristor elements connected between a polyphase alternating current supply source and a load for supplying the load with direct current produced by rectification at the thyristors, a pulse generator for producing control pulses, circuit means including a pulse distributor for delivering the pulse output from said generator to the control elements on said thyristors for igniting the same in the proper sequence to produce the desired current rectification, a pulse shifter interposed in said circuit means between said pulse generator and pulse distributor capable of changing over the operation of said thyristor from a rectifier to an inverter mode by a shift in the pulses, means responsive to excess current flow in said direct current load circuit for actuating said pulse shifter to effect the changeover from rectifier to inverter operation, and means operable at the end of a delay following said changeover and provided said excess direct current then still exists for suppressing further delivery of ignition control pulses to said thyristors.

2. A converter arrangement as defined in claim 1 wherein suppression of further delivery of the ignition control pulses to said thyristors is effected with a delay of from 180° to 270° of the alternating current wave form after the first zero passage of the rectified direct current voltage.

3. A converter arrangement as defined in claim 1 wherein said means responsive to excess current flow in said direct current load circuit for actuating said pulse shifter includes a trigger member producing an output signal when the excess current appears, and wherein said delayed means operable to suppress further delivery of ignition control pulses to said thyristors comprises a delay-action bistable multivibrator having its input connected to a first output of said trigger member, a first AND member having one input thereto connected to the output of said multivibrator and a second input connected-directly to a second output from said trigger, and anegative AND member having one input thereto connected to the output from said first AND member, a second input to said negative iAND member and the output therefrom being included in said circuit means between said pulse generator and pulse distributor.

4. A converter arrangement as defined in claim 1 wherein said thyristors are arranged in a bridge circuit, wherein said means responsive to excess current flow in said direct current-load circuit for actuating said pulse shifter includes a trigger member producing an output signal when the excess current appears, and wherein said delayed means operable to suppress further delivery of ignition control pulses to said thyristors comprises current transformers provided in each branch of the bridge circuit, said transformers being connected to integrating means for integrating the respective outputs of the current transformers with respect to time, a maximum value device to which the respective outputs from said integrating means are connected for evaluation, said maximum value device serving to transmit from its output only the maximum value of theintegrated currents, a first AND member having one input thereto connected directly to the output from said trigger and a second input connected to the output from said trigger and a second input connected to the output from said maximum value device, and a negative AND member having one input thereto connected to the output of said first AND member, a second input to said negative AND member and the output therefrom being included in said circuit meai s between said pulse generator and pulse distributor.